United States Patent [19]

Gennetten

[11] Patent Number: 5,753,906

[45] Date of Patent: May 19, 1998

[54] COLOR SEPARATION USING MULTIPLE POINT NARROW BAND ILLUMINATION FROM N-COLORS OF LIGHT SOURCES

[75] Inventor: K. Douglas Gennetten, Fort Collins, Colo.

[73] Assignee: Hewlett-Packard Company, Palo Alto, Calif.

[21] Appl. No.: 692,545

[22] Filed: Aug. 5, 1996

Related U.S. Application Data

[63] Continuation of Ser. No. 404,209, Mar. 14, 1995, abandoned.

[51] Int. Cl.$^6$ ....................................... G01J 3/50
[52] U.S. Cl. .............. 250/226; 250/578.1; 250/208.1; 356/405; 348/272; 348/599; 358/515
[58] Field of Search .......................... 250/226, 578.1, 250/208.1; 356/405, 408, 420; 348/272, 279, 599; 358/505, 515, 483

[56] References Cited

U.S. PATENT DOCUMENTS

| | | | |
|---|---|---|---|
| 4,245,241 | 1/1981 | Sato et al. | 348/279 |
| 4,278,538 | 7/1981 | Lawrence et al. | 209/580 |
| 4,709,144 | 11/1987 | Vincent . | |
| 4,709,259 | 11/1987 | Suzuki | 358/48 |
| 4,716,285 | 12/1987 | Konishi | 250/205 |
| 4,926,041 | 5/1990 | Boyd . | |
| 4,930,008 | 5/1990 | Suzuki et al. | 358/75 |
| 5,191,406 | 3/1993 | Brandestini et al. | 358/505 |
| 5,272,518 | 12/1993 | Vincent . | |
| 5,278,639 | 1/1994 | Fort | 358/42 |
| 5,471,052 | 11/1995 | Ryczek | 250/226 |
| 5,612,794 | 3/1997 | Brandestini et al. | 358/505 |

FOREIGN PATENT DOCUMENTS

| | | | |
|---|---|---|---|
| 528090 | 10/1940 | United Kingdom . | |
| 2217950 | 4/1988 | United Kingdom | 1/46 |

OTHER PUBLICATIONS

Color Correction Using Principal Components, M.J. Vrhel and H.J. Trussell, *Color Research And Applications Journal*, vol. 17 #5, Oct. 1992, pp. 328–338.

*Primary Examiner*—Edward P. Westin
*Assistant Examiner*—John R. Lee

[57] ABSTRACT

Color scanner apparatus utilizing color separation with multiple point narrow band illumination from N-colors of LEDs may comprise a multicolor light source for successively illuminating an object with N different colors of light between about a color red and a color blue. A photosensor responsive to light reflected from the object converts the reflected light into sets of color image data signals corresponding to each of the N different colors. A color image data processing apparatus connected to the photosensor converts the sets of color image data signals corresponding to each of the N different colors into equivalent tristimulus values.

18 Claims, 8 Drawing Sheets

COLOR SEPARATION USING MULTIPLE POINT NARROW BAND ILLUMINATION FROM N-COLORS OF LIGHT SOURCES

CROSS REFERENCE TO RELATED APPLICATION

This is a continuation of application Ser. No. 08/404,209 filed on Mar. 14, 1995, now abandoned.

BACKGROUND

The present invention relates to color optical scanners in general and more specifically to a method and apparatus for separating color image data from a scanned object.

Color optical scanners produce color image data signals representative of an object or document being scanned by projecting an image of the object or document onto an optical photosensor array. The color image data signals may then be digitized and stored for later use. For example, the color image data signals may be used by a personal computer to produce an image of the scanned object on a suitable display device, such as a CRT.

A typical optical scanner comprises illumination and optical systems to illuminate the object and focus a small area of the illuminated object, usually referred to as a "scan line," onto the photosensor array. The entire object is then scanned by sweeping the illuminated scan line across the entire object, either by moving the object with respect to the illumination and optical assemblies or by moving the illumination and optical assemblies relative to the object.

A typical illumination system for a color scanner may include a suitable white light source, such as a fluorescent or incandescent lamp, to illuminate the object. A typical optical system may include a lens assembly to focus the image of the illuminated scan line onto the surface of the optical photosensor array and may also include one or more mirrors to "fold" the path of the light beam, thus allowing the optical system to be conveniently mounted within a relatively small enclosure.

While various types of photosensor devices may be used to detect the light from the illuminated scan line, a commonly used sensor is the charge coupled device or CCD. A typical CCD may comprise a large number of individual cells or "pixels," each of which collects or builds-up an electrical charge in response to exposure to light. Since the size of the accumulated electrical charge in any given cell or pixel is related to the intensity and duration of the light exposure, a CCD may be used to detect light and dark spots on an image focused thereon. In a typical scanner application, the charge built up in each of the CCD cells or pixels is measured and then discharged at regular intervals known as sampling intervals, which may be about 5 milliseconds or so for a typical scanner.

Color optical scanners of the type described above usually operate by collecting multiple color component images of the object being scanned. For example, data representative of red, green, and blue color components of the image of the scan line may be produced, correlated, and stored by the scanner apparatus. The particular color components, e.g., red, green, and blue, are commonly referred to as primary colors, primary stimuli, or simply, primaries. As is well-known, various combinations of three such primary colors can be used to produce any color stimulus contained within the gamut of colors on the CIE chromaticity diagram that lie within the triangle of primaries. The amounts of each primary color required to match a particular color stimulus are referred to as tristimulus values. Written mathematically:

$$C = r(R) + g(G) + b(B)$$

Put in other words, a given color stimulus C (e.g., the image of the scan line) can be matched by r units of primary stimulus R (red), g units of primary stimulus G (green), and b units of primary stimulus B (blue). All the different physical stimuli that look the same as the given color stimulus C will have the same three tristimulus values r, g, and b. Thus, it is possible to match a color stimulus by a mixture of three primary colors or stimuli, with the tristimulus values r, g, and b determining the required amount of each primary color. It is important to keep in mind that the foregoing method will only achieve psychophysical color match (i.e., the color will appear the same to the human eye), as opposed to a physical or spectral match.

Many different techniques have been developed for collecting data representative of multiple color component images (i.e., the tristimulus values) of the object being scanned. One technique is to project the image of the illuminated scan line onto a single linear photosensor array. However, in order to collect the multiple color component images (i.e., the tristimulus values) of the illuminated scan line, a different color light source (a primary) is used to illuminate the scan line on each of three scanning passes. For example, the object first may be scanned using only red light, then only green light, and finally only blue light. The output signal from the photosensor for each color thus represents the tristimulus value for that color. In a variation of this technique, three scanning passes may be made using a white light source, but the light from the illuminated scan line is filtered by a different color filter during each of the three passes before being focused onto the optical photosensor array. Either way, the tristimulus values for the primaries (i.e., the red, green, and blue colors) may be determined from the output signal of the photosensor.

Another technique, described in U.S. Pat. No. 4,709,144 issued to Vincent and U.S. Pat. No. 4,926,041, issued to Boyd, et al., both of which are hereby specifically incorporated by reference for all that is disclosed therein, is to split the illuminated (i.e., polychromatic) scan line into multiple color component beams, each of which are then focused onto multiple linear photosensor arrays. For example, the illuminated scan line may be split into red, green, and blue color component portions which are then simultaneously projected onto three (3) separate linear photosensor arrays. The output from each photosensor represents the tristimulus value for the corresponding primary. This technique allows the tristimulus values from any particular scan line to be generated simultaneously, thus allowing easier correlation of the image data for each separate primary.

Regardless of the particular technique used to collect the tristimulus values, the color accuracy of the reproduced image will be only as good as the spectral band match between the spectral sensitivity of the photosensor used to record the image and the spectral sensitivity for human vision. As is well-known, the human eye comprises three different kinds of color receptors (cones) that are sensitive to various spectral bands or regions that roughly correspond to red, green, and blue light. The receptors are relatively "broad band" devices, sensitive to a wide range of wavelengths within each color band region, as seen in FIG. 1. For example, blue receptors are typically sensitive to light having wavelengths ranging from about 400 nm to 500 nm; green receptors to light having wavelengths ranging from about 480 nm to 600 nm; and red receptors to light having wavelengths ranging from about 500 nm to 650 nm. While the specific sensitivities of the color receptors vary from person to person, the average response for each receptor has been quantified and is known as the "CIE standard observer."

The ability to accurately reproduce colors, at least on a psychophysical basis, in a tristimulus system requires a fairly close spectral band match between the primaries and the receptors. Therefore, accurate color reproduction may be achieved by ensuring that the primaries have spectral bands or ranges that match as closely as possible the spectral response ranges of the three receptors (i.e., red, green, and blue) in the human eye. Since the receptors of the human eye are sensitive to a relatively broad spectral range of light colors (see FIG. 1), the filters or illumination sources used in color scanner devices must have similar broad spectral ranges if accurate color reproduction is to be achieved. Unfortunately, it is difficult to fabricate light sources and/or filters having broad band spectral ranges that can closely approximate those of the human receptors, much less provide an identical match. Moreover, the requirement for such broad band devices limits the number of alternative devices available to the designer, thus limits the ability to produce smaller, lighter, or more inexpensive color scanner designs. An even more significant disadvantage is that such broad band devices tend to limit the signal to noise ratio of the scanner, which can result in decreased image quality.

Consequently, there remains a need for a color scanner that is not dependent on broad band light sources or filters that attempt to match the spectral bands of the receptors of the human eye. Ideally, such a scanner should be able to utilize relatively compact and inexpensive narrow band illumination devices, such as light emitting diodes, but without reducing color fidelity or signal to noise ratio of the color image data. Additional utility could be realized if such a scanner could also correct the color image data so that the object will appear to have been recorded under a different illuminant. For example, it is often desirable to reproduce the image of the scanned object on a computer display device, usually a CRT. If the illuminant for which the color scanner is calibrated differs from the equivalent illuminant of the computer display device, then a color shift will be perceived. Similarly, if the display device is a color printer, then the illuminant for which the printer is calibrated must be identical to the scanner illuminant calibration to avoid a color shift.

SUMMARY OF THE INVENTION

Color scanner apparatus utilizing color separation with multiple point narrow band illumination from N-colors of narrow band light sources, such as LEDs, may comprise a multicolor light source for successively illuminating an object with N different colors of light between about a color red and a color blue. A photosensor responsive to light reflected from the object converts the reflected light into sets of color image data signals corresponding to each of the N different colors. A color image data processing apparatus connected to the photosensor converts the sets of color image data signals corresponding to each of the N different colors into equivalent tristimulus values.

A method of color scanning may comprise the steps of successively illuminating the object with N different colors of light spread across the visible spectrum, i.e., between about a color red and a color blue; collecting corresponding N color image data from light reflected by the object during the time the object is successively illuminated by each of the N colors of light; and converting the N color image data into equivalent tristimulus values.

Advantageously, the primaries corresponding to the tristimulus values into which the color image data are converted may be selected to be any desired color or color spectrum, although it will usually be desired to select primaries corresponding to the color matching functions of the CIE standard observer. As a result, the present invention is capable of producing color image data that accurately represent the color of the scanned object, but without the need to resort to illuminants or filters having spectral energy distributions that match the receptors of the human eye. In one preferred embodiment, relatively narrow band light sources such as LED's may be used, which not only represents a cost savings, but also increases design flexibility in that LED's may more easily allow for the design of compact, light weight, and low cost light source assemblies. Another advantage associated with LED's is that their relatively narrow band light output increases the overall signal to noise ratio of the color image data, thus increasing overall image quality.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
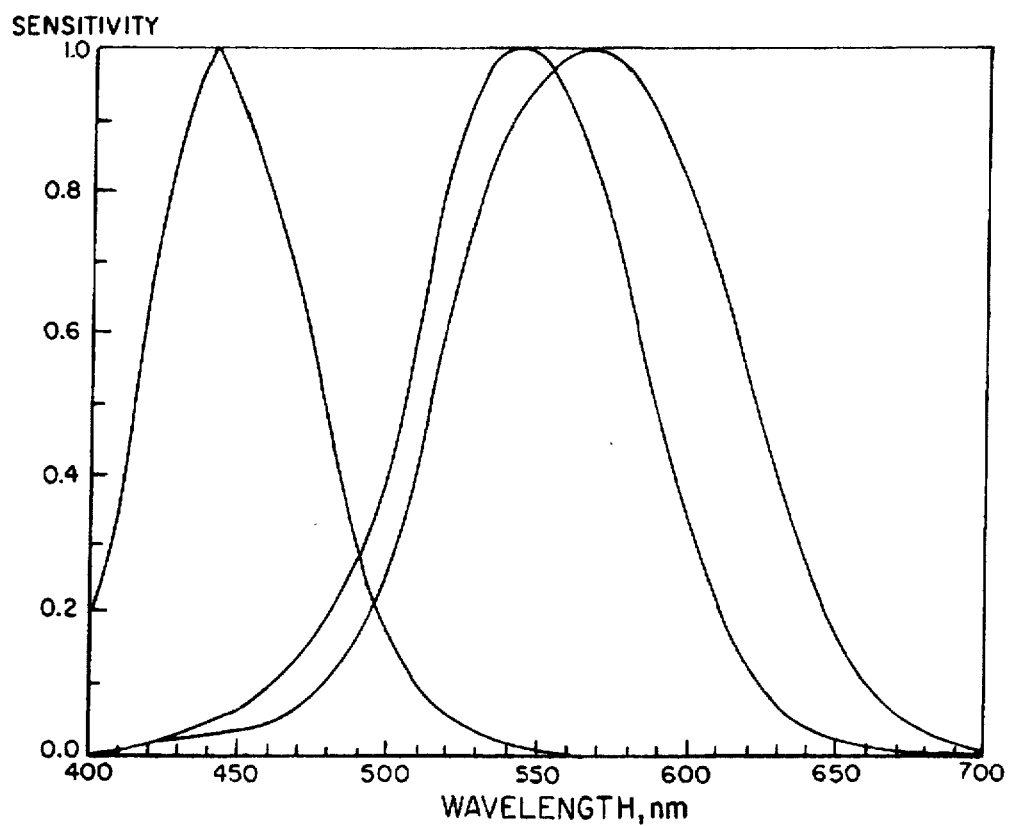
FIG. 1 is a graph showing the normalized spectral sensitivities of the three types of receptors in the human retina.
Figure 4:
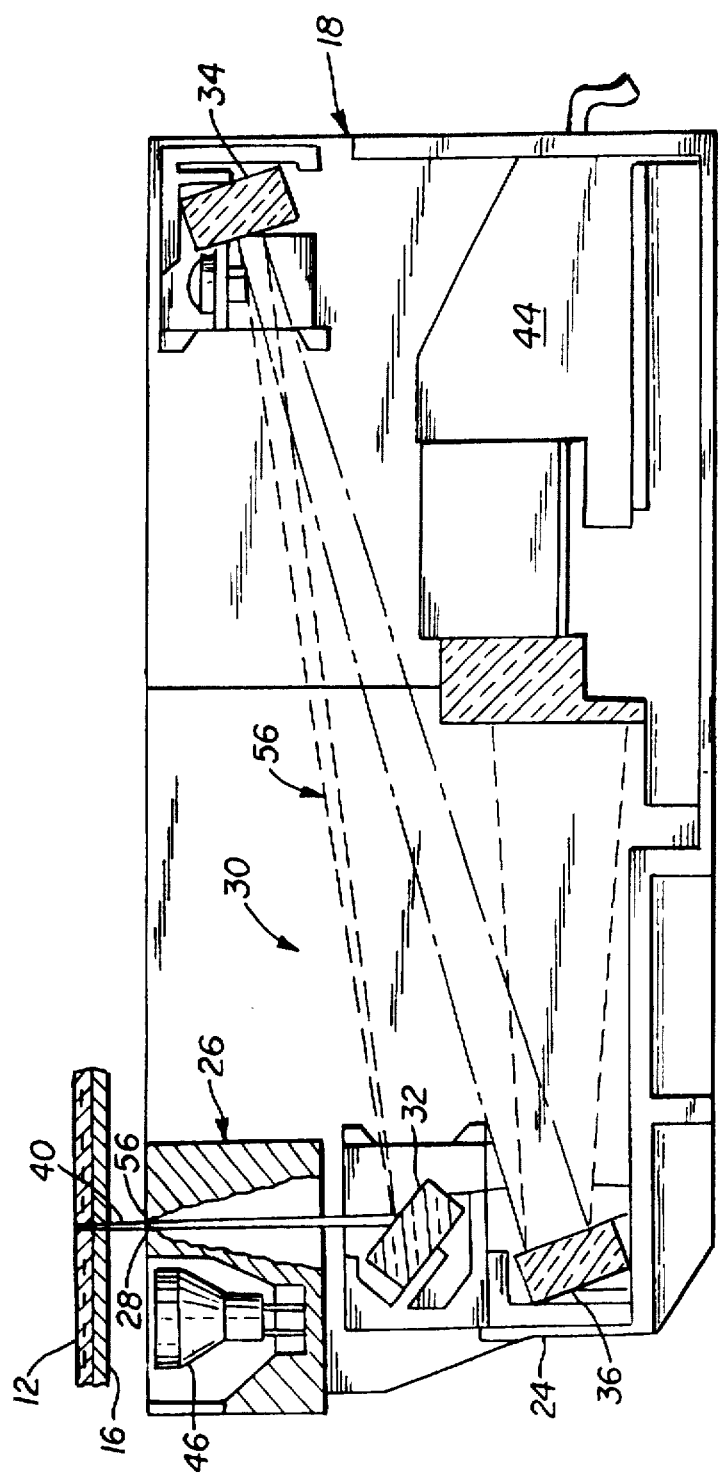
FIG. 4 is a cross-sectional view in elevation of the carriage assembly of the optical scanner device of FIGS. 2 and 3.
Figure 5:
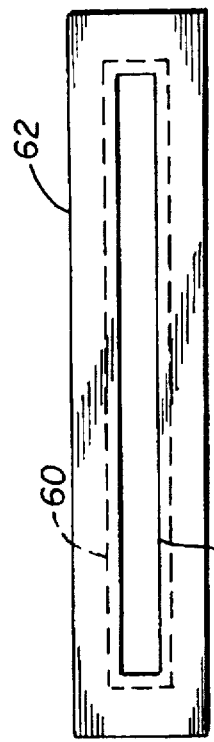
FIG. 5 is a plan view of a photosensor array used in the optical scanner device.
Figure 6:
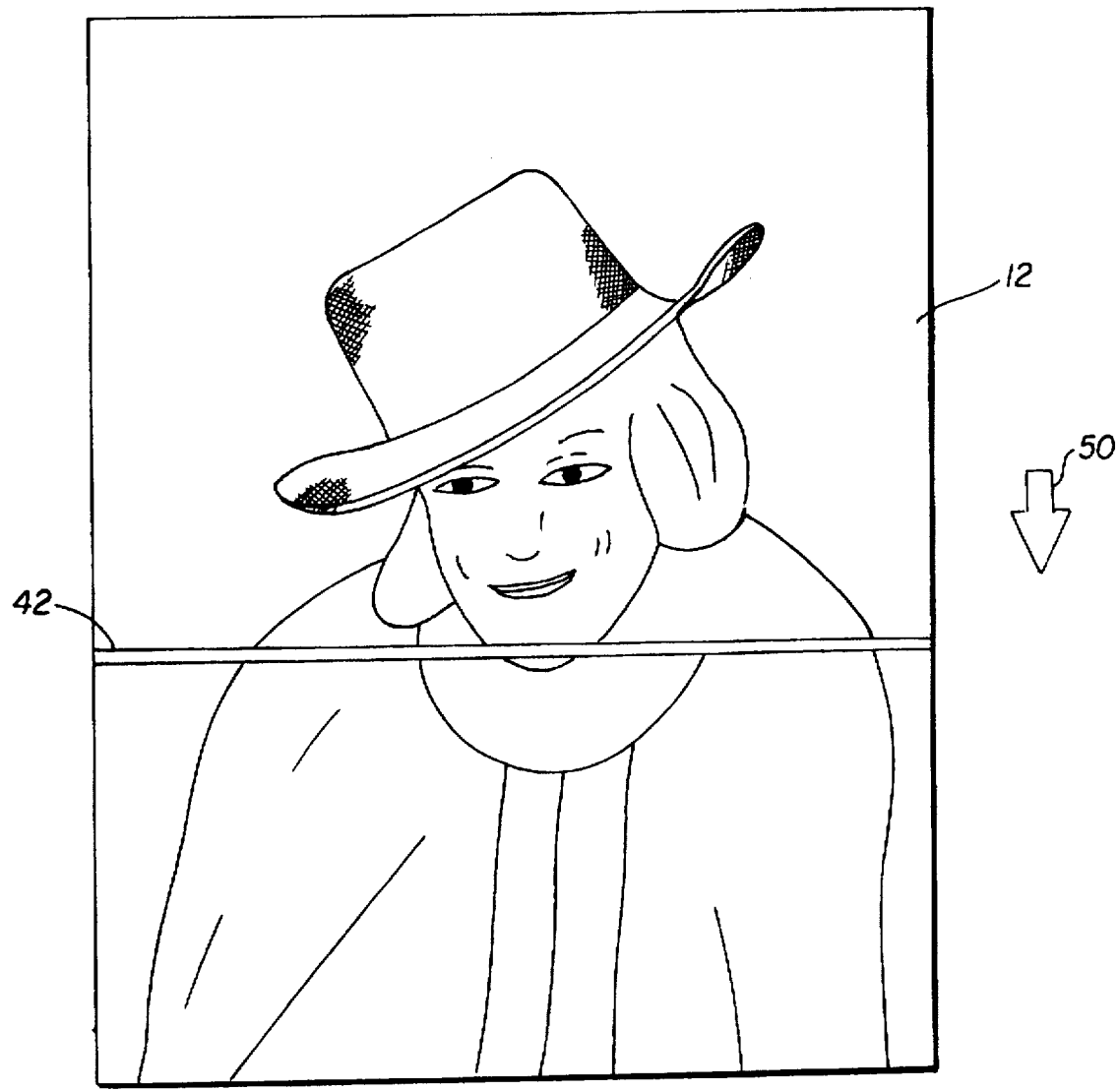
FIG. 6 is a plan view of a document which is being scanned by an optical scanner device which illustrates the movement of an illuminated scan line across the document.

Color separation using multiple point narrow band illumination from N-colors of narrow band light sources, such as LEDs, is shown in FIGS. 2–5 as it could be used on a color optical scanner 10 adapted to produce machine readable color image data representative of a color image of an object 12, such as a sheet of paper with colored graphics provided thereon as illustrated in FIG. 6. Essentially, the color optical scanner 10 may include a housing 22 having a top panel 14 to which is mounted a transparent platen 16 for supporting the object 12 (not shown in FIG. 1) to be scanned. The scanner 10 also includes a carriage assembly 18 adapted to be moved back and forth underneath the transparent platen 16 along scanning axis AA to accomplish the function of scanning the object 12.

Figure 3:
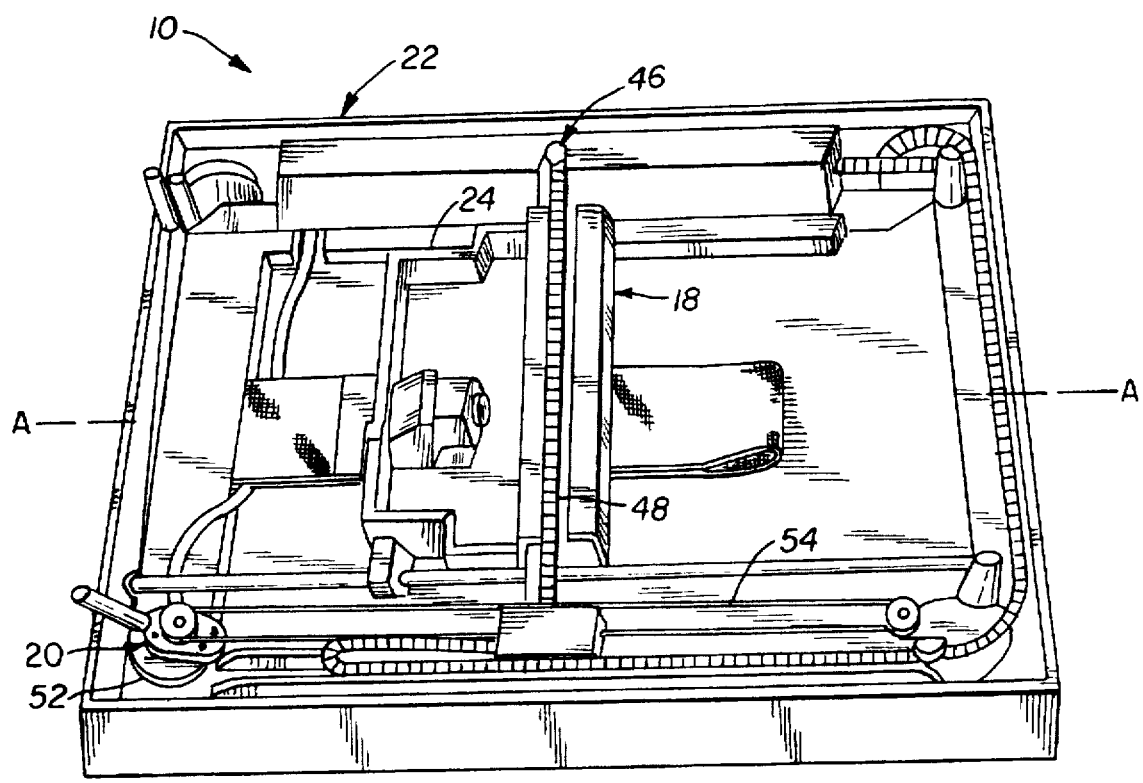
FIG. 3 is a perspective view of the optical scanner device of FIG. 2 with the top panel removed.

Referring now to FIGS. 3–5, the housing 22 of optical scanner 10 may include a suitable displacement assembly 20 to which is mounted the carriage assembly 18. The displacement assembly 20 moves the carriage assembly 18 back and forth underneath the transparent platen 16. The carriage assembly 18 may comprise a housing 24 adapted to receive a multicolor light source assembly 26, an optional slit aperture assembly 28, as well as the various components of the optical system 30, including first, second, and third mirrors 32, 34, and 36, and a lens assembly 38 for focusing light rays 40 reflected from the scan line 42 (FIG. 6) onto the light sensitive surface 64 of a suitable photosensor, such as CCD array 62 (FIG. 5) contained within detector assembly 44. The scanner 10 may also include a suitable electronic control and data processing system 70 (FIG. 7) for controlling the various components and functions of the scanner 10 and for processing the color image data from the detector assembly 44. Alternatively, a suitable data processing device, such as a personal computer (not shown) connected to the scanner 10 may be used to process the color image data.

Figure 7:
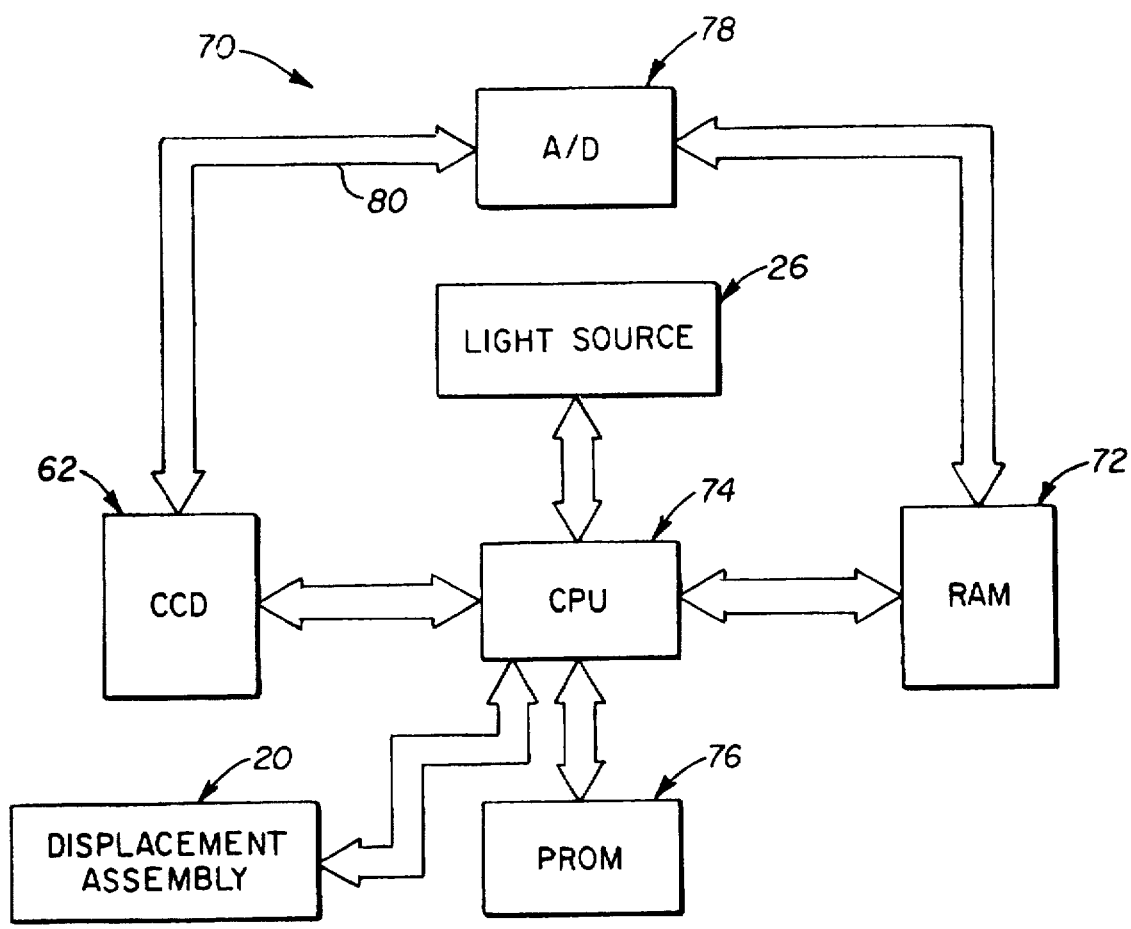
FIG. 7 is a block diagram of a control and data processing system for converting sets of color image data into tristimulus values.

Briefly, the electronic control and data processing system 70 shown in FIG. 7 comprises a central processing unit or CPU 74 that controls the photosensor or CCD array 62, a programmable read-only memory or PROM 76, an analog to digital (A/D) converter 78, and a memory device, such as random access memory (RAM) 72. The PROM 76 may be programmed to use the method of principal component analysis to convert the sets of color image data corresponding to the N colors used to illuminate the object into the appropriate tristimulus values, as will be explained in greater detail below. The tristimulus color image data may then be stored in RAM 72 where they may be accessed by a suitable optical data system (not shown).

The multicolor light source assembly 26 is capable of selectively producing N colors of light ranging across the visible spectrum from about a color blue to about a color red. In one preferred embodiment, the light source assembly 26 may comprise a Light Emitting Diode (LED) array 46 for producing 4 different colors of illumination, roughly corresponding to the colors blue, blue-green, green, and red. The LED array comprises a plurality of separate light emitting elements 48 (FIGS. 3, 8) of the 4 different colors. The separate light emitting elements 48 are connected so that all of the elements 48 for a given color can be illuminated simultaneously, thus illuminating the object 12 being scanned with that particular color.

The object 12 is scanned by actuating the displacement assembly 20 to move the carriage assembly 18 along scanning axis AA (FIG. 3), which causes the illuminated scan line 42 to be swept across the object 12 in a direction generally indicated by arrow 50, as best seen in FIG. 6. However, instead of illuminating the object 12 with white light, as is done in some color scanners, the object 12 being scanned by scanner 10 is successively illuminated with each of the four (4) different colors of light from the multicolor light source assembly 26. That is, the scan line 42 is swept across the object 12 four times, the object 12 being illuminated with a different color each time. During each sweep, image data relating to the particular color of the illuminating light is collected by the photosensor or CCD array 62 (FIG. 5) contained within the detector assembly 44 (FIG. 4). After the four sweeps have been completed, the RAM 72 in the control and data processing system 70 will contain sets of color image data that correspond to each of the four colors of illumination. The control and data processing system 70 then uses the method of principal components to convert the sets of color image data into tristimulus values corresponding to a desired set of primary stimuli.

As will be explained in greater detail below, the method of principal components is based on the assumption that if the spectral reflectances of the object are known, then the colors of the object will be known under all possible illuminating conditions. The first step in the principal components method is to find a small number of principal components, the linear combination of which approximates the reflection spectra of the object. Once the principal components of the reflection spectra of the object are determined, the tristimulus values of the object under the recording illuminant (e.g., multicolor light source assembly 26) may be corrected to any desired set of primary stimuli by utilizing the appropriate transfer function.

In one preferred embodiment, the desired set of primary stimuli may be selected to be those primary stimuli that will produce a color match with the CIE standard observer. The resulting tristimulus values will then accurately represent the colors of the scanned object even though the four colors used to illuminate the object may not have had spectral energy distributions that matched the spectral energy distributions of the receptors of the human eye.

A significant advantage of the present invention, then, is that it is capable of producing color image data that accurately represent the color of the scanned object, but without the need to resort to illuminants or filters having spectral energy distributions that match the receptors of the human eye. Indeed, in one preferred embodiment, relatively narrow band light sources such as LED's may be used. The ability to substitute LED's for more conventional illumination sources not only represents a cost savings, but also increases design flexibility in that LED's may more easily allow for the design of compact, light weight, and low cost light source assemblies. Another advantage associated with the ability to use LED's is that their relatively narrow band light output increases the overall signal to noise ratio of the color image data, thus increasing overall image quality.

Still other advantages are realized by color separation using multiple point narrow band illumination from N-colors of LEDs according to the present invention. For example, while one preferred embodiment makes use of four different colors of LEDs (blue, blue-green, green, and red), any number of colors may be used, generally resulting in increased color fidelity with increasing numbers of colors. Also, while the principal components method can convert the N colors of color image data into corresponding tristimulus values (i.e., three colors of color image data) for a set of primaries having spectral energy distributions that match those of the receptors of the human eye, the method is not limited to any particular set of primaries, and can be used to produce the corresponding tristimulus values for any desired set of primaries. The principal components method may also be used to correct the color image data so that the object will appear to have been recorded under a different illuminant.

Figure 2:
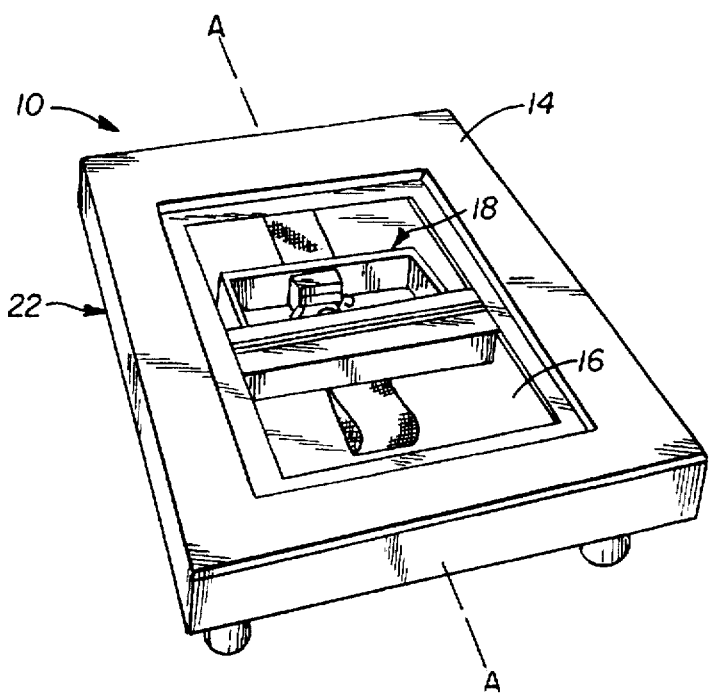
FIG. 2 is a perspective view of one embodiment of an optical scanner device utilizing color separation with multiple point narrow band illumination from four colors of LEDs.

The details of one embodiment of an optical scanner 10 that utilizes color separation using multiple point narrow band illumination from N-colors of LEDs are best seen by referring to FIGS. 2–4 simultaneously, with occasional reference to FIGS. 5, 6, and 7. Essentially, the optical scanner 10 may include a housing 22 having a top panel 14 adapted to receive a transparent platen 16. The object 12 (FIG. 6) may be placed image-side down on the transparent platen 16 to accomplish the function of scanning. The carriage assembly 18 is slidably mounted within the scanner housing 22 and is moved back and forth underneath the transparent platen 16 by the displacement assembly 20.

Referring now to FIGS. 3 and 4, the carriage assembly 18 may comprise a carriage housing 24 adapted to receive the multicolor light source assembly 26 and the slit aperture assembly 28, although a slit aperture 28 assembly is not always required. Carriage assembly 18 also includes the various components of the optical system 30. The carriage assembly 18 is mounted to the scanner housing 22 and displacement assembly 20 so that it may be moved relative to the transparent platen 16 and the object 12 supported thereon in a manner well-known in the art to produce a sweeping scan image of the object 12 at the image region 60 over the light sensitive surface 64 of photosensor or CCD array 62 (FIG. 5). Generally speaking, the displacement assembly 20 may comprise a drive motor 52 and a drive belt 54 for moving the carriage assembly 18 back and forth underneath the platen 16 along the scanning axis AA. However, since many different kinds of displacement assemblies 20 for accomplishing the foregoing functions are known and available to persons having ordinary skill in the art, the displacement assembly 20 will not be described in further detail.

The optical system 30 mounted within the carriage assembly 18 may comprise a plurality of mirrors 32, 34, and 36 mounted within the housing 24 so as to define a folded light path 56 that extends from the illuminated scan line 42 (FIG. 6) of the object 12, through aperture 56 and lens assembly 38 and onto the photosensor or detector assembly 44. Again, since carriage assemblies of the type described above are known to persons having ordinary skill in the art, the particular carriage assembly 18 used in one preferred embodiment of the scanner 10 will not be described in further detail. However, by way of example, the structure of the optical scanner 10 may be similar or identical to the optical scanner described in U.S. Pat. No. 4,926,041 of Boyd et al. which is specifically incorporated herein by reference for all that it discloses.

It should be noted that while the scanner 10 shown and described herein accomplishes scanning by moving the light source and optical assemblies 26 and 30 (i.e., the carriage assembly 18) with respect to the object 12, it could just as easily accomplish scanning by moving the object 12 with respect to stationary illumination and optical assemblies, as would be obvious to persons having ordinary skill in the art. Such an alternative embodiment would incorporate stationary light source and optical assemblies (not shown) and a moveable platen (not shown) to move the object being scanned with respect to the fixed light source and optical assemblies.

The electronic control and data processing system 70 for collecting the sets of color image data corresponding to the N colors of illumination and transforming them into desired sets of tristimulus values is shown in FIG. 7 and comprises an analog-to-digital (A/D) converter 78 connected to the data bus 80 of photosensor or CCD array 62. A/D converter 78 operates in a conventional manner to convert the analog signals received from the data bus 80 of CCD array 62 into digital signals that can be stored in a memory device, such as random access memory (RAM) 72. As was described above, the data signals received from the photosensor or CCD array 62 correspond to sets of color image data signals that correspond to each of the N different colors of illuminating light from the multicolor light source assembly 26. The control system 70 includes a programmable read-only memory (PROM) 76 that is connected to the CPU 74 and RAM 72 and may be programmed to use the method of principal components to convert the sets of color image data stored in RAM 72 into tristimulus color data, as will be described below. The CPU 74 connected to the photosensor or CCD array 62, PROM 76, and RAM 72 controls their operation.

Figure 8:
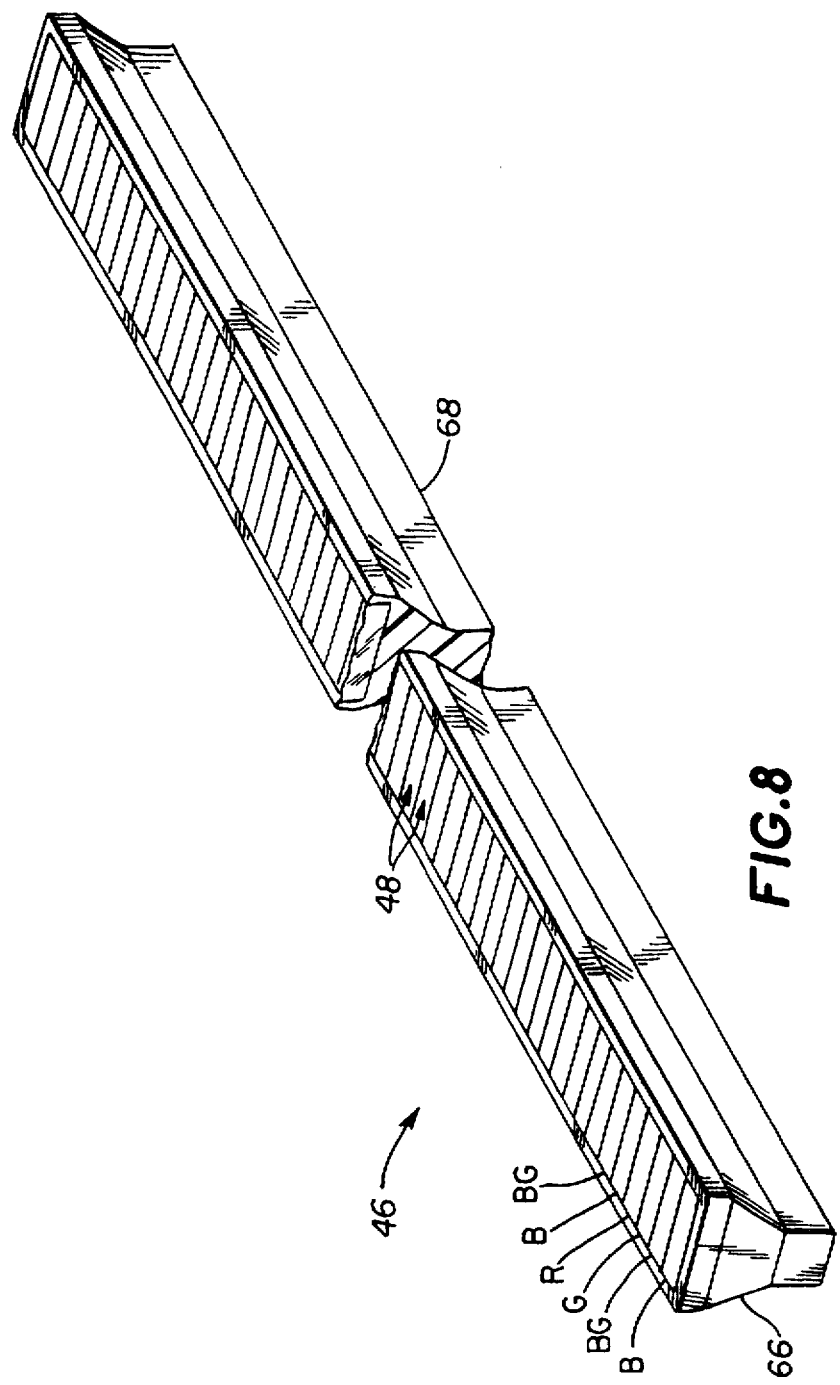
FIG. 8 is a perspective view of one embodiment of a four color LED array for successively illuminating the object being scanned.

The details of the multicolor light source assembly 26 are best seen in FIGS. 4 and 8. Essentially, the light source assembly 26 may comprise an LED array 46 mounted to the slit aperture assembly 28, on either side of the scan line defining aperture 56, although a pair of LED arrays, mounted on either side of the aperture 56 could also be used. LED array 46 comprises a plurality of individual diodes or light emitting elements 48 mounted to a suitable base or substrate assembly 68. Each light emitting element 48 is designed to produce light of a different color. For example, in the embodiment shown in FIG. 7, the LED array 46 produces light of four different colors, roughly corresponding to the colors blue, blue-green, green, and red. Therefore, each LED array 46 comprises four different types of light emitting elements 48, one of each type corresponding to a particular color. That is, the light emitting elements 48 may comprise a plurality of blue elements B, blue-green elements BG, green elements G, and red elements R. In one embodiment, the four different colors of light emitting elements 48 may be arranged sequentially, starting at one end 66 of the array 48 with a blue element B, then a blue-green element BG, a green element G, a red element R, and then repeating the sequence along the entire length of the array 46.

Another embodiment of the array 46 may make use of different numbers of each of the four colors of light emitting elements 48 depending on the spectral output characteristics of the particular light emitting elements, the spectral response characteristics of the detector assembly 44, or both. For example, if the spectral power output of the green G elements 48 is significantly less than the spectral power outputs of the other color elements, then it may be necessary to include more green G elements 48 in the array 46 compared to the other color elements. So increasing the number of green elements G with respect to the other color elements, such as blue B, blue-green BG, and red R, will help to make more equal the output signals from the detector assembly 44 for each of the four colors of illuminants. Similarly, if the spectral response of the detector array 44 is lower for some color of light than for others, it may be necessary to again increase the number of light emitting elements 48 for the corresponding color to make up the deficit. In any event, it is desired that the output signals from the detector assembly 44 should be substantially equal for each of the four colors of illuminants, e.g., blue B, glue-green BG, green G, and red R, when scanning a white object 12. Therefore, the numbers of each of the four different color elements 48, e.g., blue B, glue-green BG, green G, and red R, should be varied as necessary to achieve output signals of approximately equal strength from the detector assembly 44 when scanning a white object.

Regardless of the numbers of each of the four different color elements 48 that are used in the array 46, all of the light emitting elements 48 corresponding to a particular color are connected to the control and data processing system 70 of the scanner 10 so that they may all be switched on or off simultaneously and independently of the others. For example, if all of the blue B light emitting elements 48 are turned on, the LED array 46 will emit blue light. If the blue B light emitting elements 48 are turned off and the blue-green BG elements 48 are turned on, the LED array will emit blue-green light.

Figure 9:
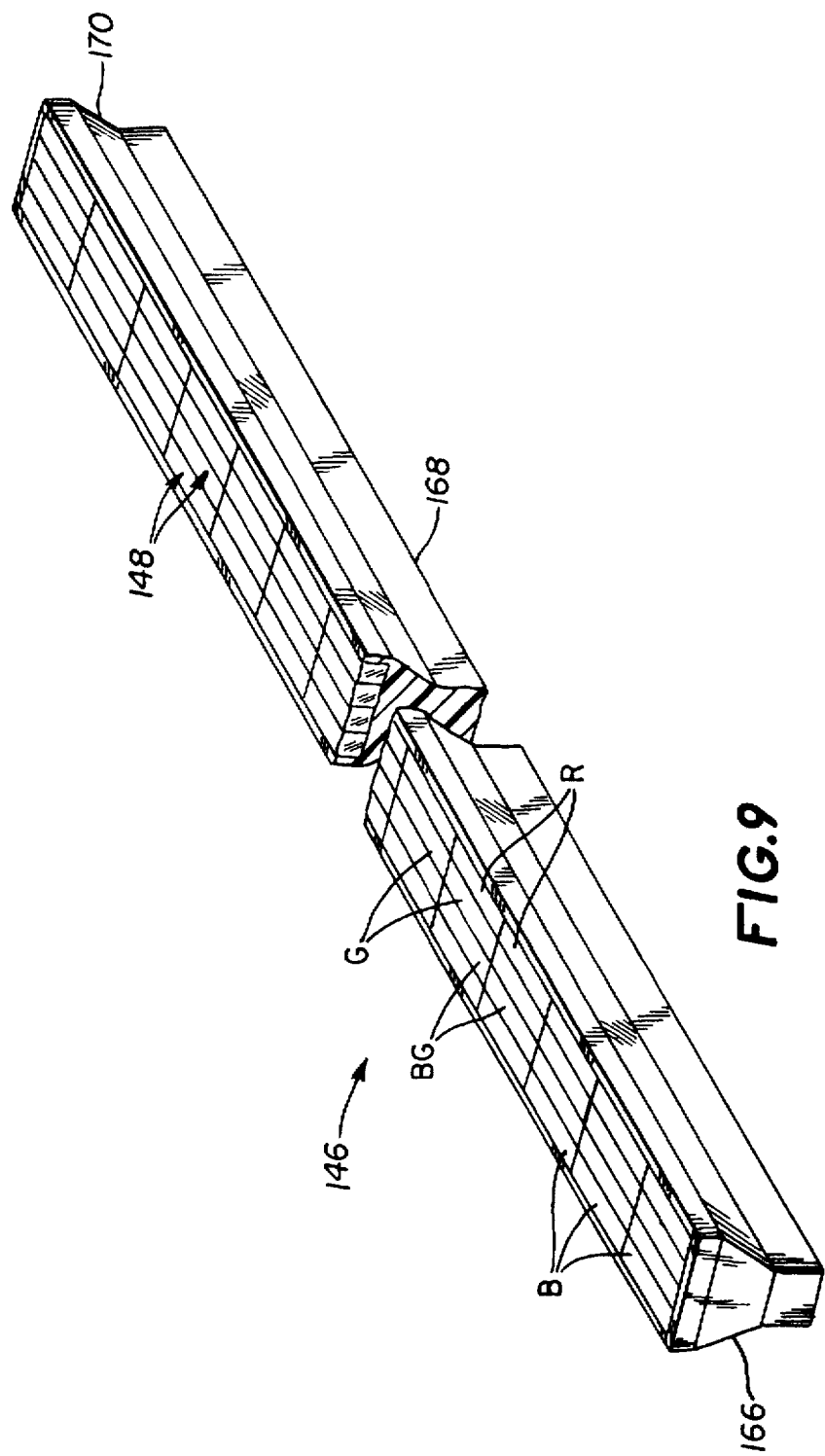
FIG. 9 is a perspective view of another embodiment of a four color LED array for successively illuminating the object being scanned.

The individual colors of light emitting elements 48 may be arranged in any convenient manner on the substrate 48. For example, another embodiment of an LED array 146 is shown in FIG. 9, wherein the individual colors blue B, blue-green BG, green G, and red R of the light emitting elements 148 are arranged on substrate 168 so that all of same color elements 148 form lines extending from a proximal end 166 to a distal end 170 of array 146. That is, all of the blue B elements 148 may comprise a first line; all of the blue-green elements BG, a second line; all of the green elements G, a third line; and all of the red elements R, a fourth line. As was the case for the first embodiment of the LED array 46 shown in FIG. 8, all of the light emitting elements 148 of the same color are connected so that they can all be turned on or off together, thus allowing the array 146 to selectively emit light of the four different colors.

Figure 10:
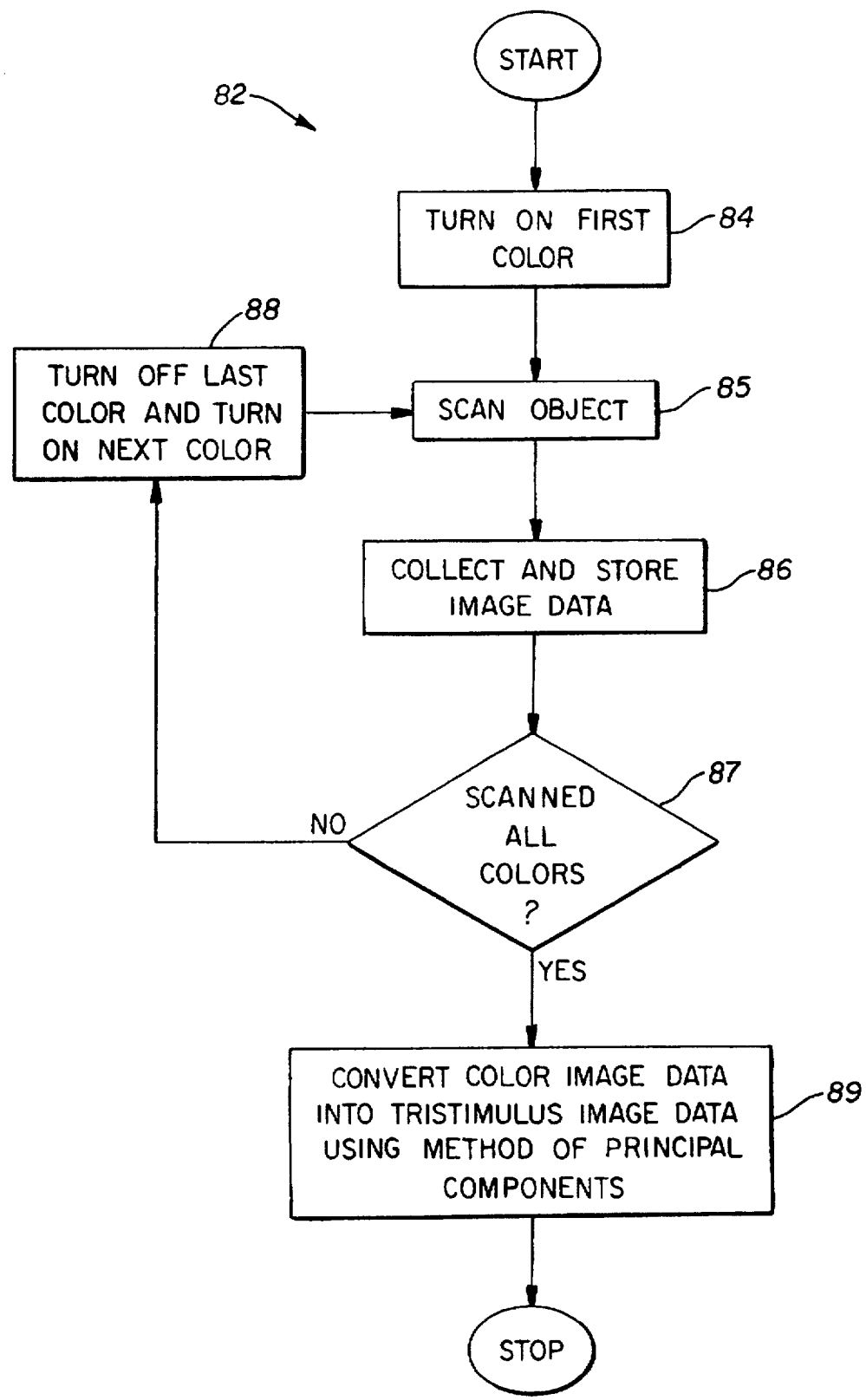
FIG. 10 is a flow chart showing the method of producing color image data using a method of principal components analysis.

The method 82 for producing color image data corresponding to the four different colors of light produced by the multicolor light source assembly 26 is shown in FIG. 10. In the first step 84, the CPU 74 turns on a first color element 48 on the LED array 46, e.g., blue. The object is then scanned at step 85 by actuating the displacement assembly 20 to move the carriage assembly, 18 underneath the platen 16 so that the blue illuminated scan line 42 moves across the entire object 12 along the scan direction 50 (see FIG. 6). The output data signals from CCD 62 that correspond to the blue light illumination are then collected and stored RAM 72 of the electronic control and data processing system 70 (FIG. 7) at step 86. Alternatively, the color image data signals may be stored in a memory system contained within an external processing system, such as a personal computer (not shown).

After the scan has been completed, the CPU then performs step 87 to determine whether the object 12 has been scanned with all the colors. If not, the CPU 74 then performs step 88 to turn off the last color (blue) and turn on the next color (e.g., blue-green). Step 85 is then repeated, except that the object 12 is scanned under the blue-green illuminant. The image data from the photosensor array 62 are again collected and stored, this time as blue-green image data, in step 86. The foregoing scanning process is repeated for each of the N colors (in this case 4 colors), until the object 12 has been scanned with each color. After all the scanning passes, the RAM 72 will contain N sets of color image data corresponding to each of the N colors of illuminants. More specifically, in the embodiment just described the RAM 72 will contain four separate sets of color image data—blue, blue-green, green, and red color image data.

Once the object 12 has been scanned under all colors, as determined by step 87, the CPU 74 next performs step 89 and uses the method of principal component analysis to convert the color image data stored in RAM 72 (i.e., the image data that corresponds to the N colors of illumination) into tristimulus image data. Advantageously, the set of primaries that correspond to the tristimulus image data may be selected to be any desired color or color spectrum, although it will usually be desired to select a set of primaries having spectral energy distributions corresponding to the receptors of the human eye, as was described above. That is, the tristimulus values to which the image data will be transformed will be the color matching functions for the CIE standard observer.

While the method of principal component analysis is well-known to persons having ordinary skill in the art, and can be found in any of a number of sources, e.g., M. J. Vrhel and H. J. Trussell, "Color Correction Using Principal Components," Color Research and Applications Journal, Vol. 17, No. 5, October 1992 pp. 328–338, which is incorporated herein for all that it discloses, the method will be briefly described herein for the purpose of providing a basis for understanding the present invention.

Essentially, the method of principal component analysis is a mathematical method that lends itself to analysis of color systems. When applied to color systems, the method of principal component analysis is based on the assumption that if the spectral reflectances in the image are known, then the colors of the surfaces in the image will be known under all possible illuminating conditions. A standard assumption in estimating spectral reflectance is that the reflection spectra can be adequately approximated by a linear combination of a small number of principal components. Almost all printed color images, which are the objects most commonly scanned, are created using the four color printing process. In the four color printing process, all colors in the image are reproduced by depositing different proportions of three colors of printing ink, yellow, magenta, and cyan, with black added in shadow areas. Since the spectral reflectances of the commonly used printing dyes and pigments are well-known, and since the spectral energy distribution of the different colors of LEDs can be determined, thus known, the method of principal components can be used to approximate the spectral reflectance of the image and transform the N color image data into tristimulus values that correspond to primaries having any desired spectral energy distribution.

It is contemplated that the inventive concepts herein described may be variously otherwise embodied and it is intended that the appended claims be construed to include alternative embodiments of the invention except insofar as limited by the prior art.

What is claimed is:

1. A method of collecting color image data from an object, comprising the steps of:

successively illuminating the object with N colors of light, each of said N colors of light comprising a different color between about a color red and a color blue;

collecting corresponding N color image data from light reflected by the object during the time the object is successively illuminated by each of the N colors of light; and converting said N color image data into equivalent tristimulus values, each equivalent tristimulus value having associated with it a primary stimulus having a predetermined spectral energy distribution.

2. The method of claim 1, wherein the step of converting said N color image data into equivalent tristimulus values is accomplished using a method of principal components.

3. The method of claim 2, wherein the spectral energy distribution of each primary stimulus substantially matches a spectral energy sensitivity of a CIE Standard Observer.

4. A method of collecting color image data from an object, comprising the steps of:

successfully illuminating the object with four colors of light, each of said four colors of light comprising a different color between about a color red and a color blue;

collecting corresponding four color image data from light reflected by the object during the time the object is successively illuminated by each of the four colors of light; and converting said four color image data into equivalent tristimulus values using a method of principal components, each equivalent tristimulus value having associated with it a primary stimulus having a predetermined spectral energy distribution that substantially matches a spectral energy sensitivity of a CIE Standard Observer.

5. The method of claim 4, wherein the four colors of light substantially correspond to about a color blue, about a color blue-green, about a color green, and about a color red.

6. Color scanner apparatus, comprising:
   a multicolor light source for successively illuminating an object with N colors of light, each of said N colors of light comprising a different color between about a color red and a color blue;
   photosensor apparatus responsive to light reflected from the object for converting the reflected light into sets of color image data signals corresponding to each of said N colors;
   color image data processing apparatus operatively associated with said photosensor apparatus and responsive to the sets color image data signals generated thereby for converting the sets of color image data signals corresponding to each of said N colors into equivalent tristimulus values, each equivalent tristimulus value having associated with it a primary stimulus having a predetermined spectral energy distribution.

7. Color scanner apparatus, comprising:
   a multicolor light source for successively illuminating an object with four different colors of light, each of said four different colors of light comprising a different color between about a color red and a color blue;
   photosensor apparatus responsive to light reflected from the object for converting the reflected light into sets of color image data signals corresponding to each of said four different colors; and
   color image data processing apparatus operatively associated with said photosensor apparatus and responsive to the sets of color image data signals generated thereby for converting the sets of color image data signals corresponding to each of said four different colors into equivalent tristimulus values, each equivalent tristimulus value having associated with it a primary stimulus having a predetermined spectral energy distribution.

8. The color scanner apparatus of claim 7, wherein said multicolor light source comprises a plurality of light emitting elements for emitting the four different colors of light, said light emitting elements for each color being operatively connected together so that all of said light emitting elements for each of the four different colors can be independently actuated.

9. The color scanner apparatus of claim 8, wherein said light emitting elements comprise light emitting diodes (LEDs).

10. The color scanner apparatus of claim 9, wherein the four colors of light substantially correspond to about a color blue, about a color blue-green, about a color green, and about a color red.

11. The color scanner apparatus of claim 10, wherein said photosensor apparatus comprises a linear CCD.

12. The color scanner apparatus of claim 6, further comprising imaging apparatus for focusing light from an illuminated scan line on the object onto an image region and for providing an image of the illuminated scan line on the object at the image region and wherein said photosensor apparatus is positioned in said image region.

13. Color scanner apparatus, comprising:
   a multicolor light source for successively illuminating an object with N colors of light, each of said N colors of light comprising a different color between about a color red and a color blue;
   imaging apparatus for focusing light from an illuminated scan line on the object onto an image region and for providing an image of the illuminated scan line on the object at the image region;
   photosensor apparatus located in said image region for generating color image data signals representative of the intensity of light impinged thereon;
   displacement apparatus for producing relative displacement between the object and said imaging apparatus and for producing a sweeping scan image of the object in the image region; and
   color image data processing apparatus operatively associated with said photosensor apparatus and responsive to the sets color image data signals generated thereby for converting the sets of color image data signals corresponding to each of said N colors into equivalent tristimulus values, each equivalent tristimulus value having associated with it a primary stimulus having a predetermined spectral energy distribution.

14. Color scanner apparatus, comprising:
   a multicolor light source for successively illuminating an object with four different colors of light, each of said four different colors of light comprising a different color between about a color red and a color blue;
   imaging apparatus for focusing light from an illuminated scan line on the object onto an image region and for providing an image of the illuminated scan line on the object at the image region;
   photosensor apparatus located in said image region for generating sets of color image data signals representative of the intensity of light impinged thereon;
   displacement apparatus for producing relative displacement between the object and said imaging apparatus and for producing a sweeping scan image of the object in the image region; and
   color image data processing apparatus operatively associated with said photosensor apparatus and responsive to the sets color image data signals generated thereby for converting the sets of color image data signals corresponding to each of said four different colors into equivalent tristimulus values, each equivalent tristimulus value having associated with it a primary stimulus having a predetermined spectral energy distribution.

15. The color scanner apparatus of claims 14, wherein said multicolor light source comprises a plurality of light emitting elements for emitting the four different colors of light, said light emitting elements for each color being operatively connected together so that all of said light emitting elements for each of the four different colors can be independently actuated.

16. The color scanner apparatus of claim 15, wherein said light emitting elements comprise light emitting diodes (LEDs).

17. The color scanner apparatus of claim 16, wherein the four colors of light substantially correspond to about a color blue, about a color blue-green, about a color green, and about a color red.

18. The color scanner apparatus of claim 17, wherein said photosensor apparatus comprises a linear CCD.

* * * * *